(12) United States Patent
Ogawa et al.

(10) Patent No.: US 9,358,990 B2
(45) Date of Patent: Jun. 7, 2016

(54) RAILCAR DAMPING DEVICE

(75) Inventors: Takayuki Ogawa, Sagamihara (JP); Jun Aoki, Sagamihara (JP); Masaru Uchida, Sagamihara (JP)

(73) Assignee: KYB Corporation, Tokyo (JP)

( * ) Notice: Subject to any disclaimer, the term of this patent is extended or adjusted under 35 U.S.C. 154(b) by 106 days.

(21) Appl. No.: 14/127,896

(22) PCT Filed: Jun. 19, 2012

(86) PCT No.: PCT/JP2012/065600
§ 371 (c)(1),
(2), (4) Date: Dec. 19, 2013

(87) PCT Pub. No.: WO2012/176758
PCT Pub. Date: Dec. 27, 2012

(65) Prior Publication Data
US 2014/0196627 A1 Jul. 17, 2014

(30) Foreign Application Priority Data
Jun. 20, 2011 (JP) .................................. 2011-136161

(51) Int. Cl.
| F16F 9/34 | (2006.01) |
| B61F 5/24 | (2006.01) |
| F15B 21/00 | (2006.01) |
| F16F 15/027 | (2006.01) |

(52) U.S. Cl.
CPC . *B61F 5/24* (2013.01); *B61F 5/245* (2013.01); *F15B 21/008* (2013.01); *F15B 2211/3058* (2013.01); *F15B 2211/31558* (2013.01); *F15B 2211/6303* (2013.01); *F15B 2211/6651* (2013.01); *F15B 2211/6653* (2013.01); *F15B 2211/7053* (2013.01); *F15B 2211/76* (2013.01); *F16F 15/027* (2013.01)

(58) Field of Classification Search
CPC .......... F16F 15/027; B61F 5/245; B61F 5/24; B61F 5/127
See application file for complete search history.

(56) References Cited

U.S. PATENT DOCUMENTS

| 2002/0184881 A1 | 12/2002 | Oka |
| 2011/0192157 A1 | 8/2011 | Ogawa |
| 2014/0083807 A1 | 3/2014 | Ogawa et al. |

FOREIGN PATENT DOCUMENTS

| EP | 2330302 A1 * | 6/2011 |
| EP | 2743152 A1 | 6/2014 |
| JP | H04-39303 U | 4/1992 |
| JP | 08-253146 A | 10/1996 |

(Continued)

OTHER PUBLICATIONS

European Search Report issued on Feb. 12, 2015.

*Primary Examiner* — Nicholas J Lane
(74) *Attorney, Agent, or Firm* — Rabin & Berdo, Jr.

(57) ABSTRACT

A railcar damping device includes: a tank storing a liquid; a first opening/closing valve provided in a first passage connecting a rod side chamber to a piston side chamber, which are defined by a piston, to be capable of opening and closing the first passage; a second opening/closing valve provided in a second passage connecting the piston side chamber to the tank to be capable of opening and closing the second passage; and a pump that is driven to rotate at a predetermined normal rotation speed in order to supply the liquid from the tank to the rod side chamber, wherein a rotation speed of the pump is reduced when a thrust command value is smaller than a normal lower limit value, which is a lower limit value of a thrust that can be generated by the actuator when the pump is rotated at the normal rotation speed.

8 Claims, 4 Drawing Sheets

(56) References Cited

FOREIGN PATENT DOCUMENTS

| JP | 2000-177586 A | 6/2000 |
| JP | 2002-364603 A | 12/2002 |
| JP | 2005-030559 A | 2/2005 |
| JP | 2010-065797 A | 3/2010 |
| JP | 2011-202675 A | 10/2011 |

* cited by examiner

RAILCAR DAMPING DEVICE

TECHNICAL FIELD

This invention relates to an improvement in a railcar damping device.

BACKGROUND ART

A known example of a conventional railcar damping device is interposed between a vehicle body and a truck of a railcar and used to suppress left-right direction vibration relative to an advancement direction.

JP2010-65797A discloses a railcar damping device including: a cylinder coupled to either a truck or a vehicle body of a railcar; a piston inserted into the cylinder to be free to slide; a rod inserted into the cylinder and coupled to the other of the truck and the vehicle body and to the piston; a rod side chamber and a piston side chamber defined within the cylinder by the piston; a tank storing a liquid that is supplied to the cylinder; a first opening/closing valve provided midway in a first passage that connects the rod side chamber to the piston side chamber; a second opening/closing valve provided midway in a second passage that connects the piston side chamber to the tank; a pump that supplies working oil to the rod side chamber; an exhaust passage that connects the rod side chamber to the tank; and a variable relief valve that is provided midway in the exhaust passage and has a modifiable valve opening pressure. By driving the pump, the first opening/closing valve, the second opening/closing valve, and the variable relief valve, an actuator can generate thrust in both an expansion direction and a contraction direction, and vibration of the vehicle body is suppressed by this thrust.

SUMMARY OF INVENTION

Incidentally, in this railcar damping device, the pump is driven to rotate at a predetermined rotation speed (a rotation speed per unit time), while the first opening/closing valve, the second opening/closing valve, and the variable relief valve are driven appropriately in accordance with a vibration condition of the vehicle body. Thus, vibration of the railcar is suppressed by obtaining the thrust for suppressing the vibration of the vehicle body using oil pressure.

The working oil discharged by the pump when the pump is driven to rotate at the predetermined rotation speed is suctioned from the tank, passed through a hydraulic circuit for driving the actuator, and finally returned to the tank. At this time, pressure loss occurs due to pipe resistance and the like in the hydraulic circuit, and therefore a pressure in the cylinder must be made equal to a tank pressure.

Further, a minimum required amount of working oil must be secured to realize the thrust required by the actuator and a favorable thrust generation response. For this purpose, the rotation speed of the pump is set at a rotation speed with which the minimum required amount of working oil can be secured.

Hence, the rotation speed of the pump has a determined lower limit. Further, since pressure loss due to pipe resistance and the like cannot be eliminated completely, the thrust that can be generated by the actuator also has a lower limit. Accordingly, the actuator cannot generate a smaller amount of thrust than the lower limit.

Therefore, when an attempt is made to perform feedback control by feeding back the thrust of the actuator and a value for generating a smaller amount of thrust than the aforesaid thrust lower limit is obtained as a thrust command value, the thrust of the actuator becomes greater than the thrust command value. Accordingly, a deviation between the thrust command value and the actual thrust increases, leading to hunting in which the thrust of the actuator becomes oscillatory. As a result, passenger comfort in the vehicle body may deteriorate.

Further, when hunting occurs in the manner described above, switch operations are performed frequently on the first opening/closing valve and the second opening/closing valve, leading to a reduction in the lifespans thereof. As a result, an economic efficiency of the railcar damping device may be impaired.

This invention has been designed in consideration of the problems described above, and an object thereof is to provide a railcar damping device that is economically efficient and does not cause passenger comfort in a vehicle body to deteriorate.

According to one aspect of this invention, a railcar damping device that suppresses vibration of a vehicle body by determining a thrust to be output by an actuator as a thrust command value and controlling the actuator is provided. The actuator includes: a cylinder coupled to one of a truck and the vehicle body of a railcar; a piston inserted into the cylinder to be free to slide; a rod inserted into the cylinder and coupled to the piston and the other of the truck and the vehicle body; and a rod side chamber and a piston side chamber defined within the cylinder by the piston. The railcar damping device includes: a tank that is configured to store a liquid that is supplied to and discharged from the cylinder; a first opening/closing valve provided in a first passage connecting the rod side chamber to the piston side chamber to be capable of opening and closing the first passage; a second opening/closing valve provided in a second passage connecting the piston side chamber to the tank to be capable of opening and closing the second passage; and a pump that is configured to be driven to rotate at a predetermined normal rotation speed in order to supply the liquid from the tank to the rod side chamber. A rotation speed of the pump is reduced when the thrust command value is smaller than a normal lower limit value, which is a lower limit value of a thrust that can be generated by the actuator when the pump is rotated at the normal rotation speed.

The details as well as other features and advantages of this invention are set forth in the remainder of the specification and are shown in the accompanying drawings.

DESCRIPTION OF EMBODIMENTS

Referring to the figures, a railcar damping device 1 according to an embodiment of this invention will be described below.

Figure 1:
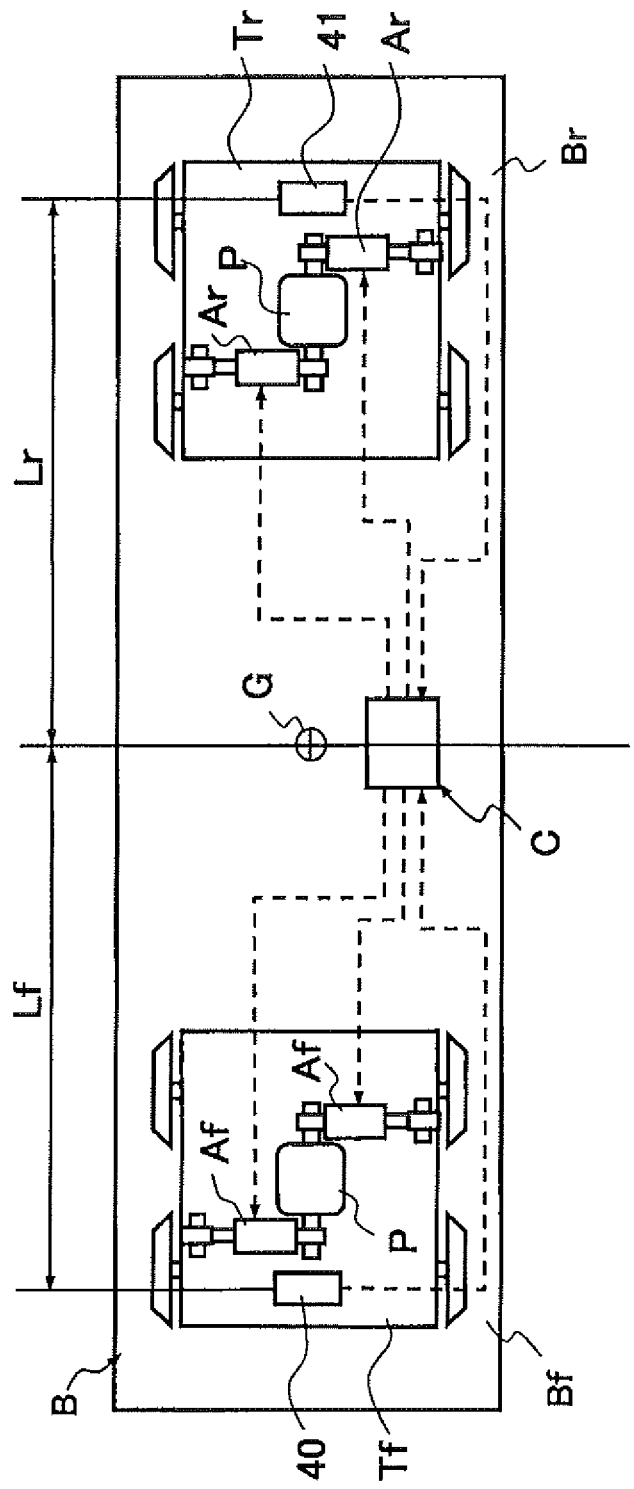
FIG. 1 is a view showing, from above, a configuration of a railcar installed with a railcar damping device according to an embodiment of this invention.

The railcar damping device 1 is used as a damping device for a vehicle body B of a railcar. As shown in FIG. 1, the railcar damping device 1 includes a front side actuator Af interposed between a front side truck Tf and the vehicle body B, a rear side actuator Ar interposed between a rear side truck Tr and the vehicle body B, and a controller C that actively controls the two actuators Af, Ar. The railcar damping device 1 determines a thrust to be output by the actuators Af, Ar as a thrust command value, and controls the actuators Af, Ar to suppress vibration of the vehicle body B.

The actuator Af and the actuator Ar are respectively provided in pairs. The front and rear actuators Af, Ar are coupled to pins P suspended downward from the vehicle body B of the railcar so as to be interposed in respective parallel pairs between the vehicle body B and the front and rear trucks Tf, Tr.

Basically, the front and rear actuators Af, Ar are actively controlled to suppress vibration in a horizontal lateral direction relative to a vehicle advancement direction of the vehicle body B. In this case, the controller C performs active control to control the front and rear actuators Af, Ar such that vibration in a lateral direction of the vehicle body B is suppressed.

More specifically, when performing control to suppress vibration of the vehicle body B, the controller C detects a lateral direction acceleration $\alpha f$ of a front portion Bf of the vehicle body B in a horizontal lateral direction relative to the vehicle advancement direction and a lateral direction acceleration $\alpha r$ of a rear portion Br of the vehicle body B in a horizontal lateral direction relative to the vehicle advancement direction. The controller C then calculates a yaw acceleration $\omega$, which is an angular acceleration about a vehicle body center G directly above the front and rear trucks Tf, Tf, on the basis of the detected lateral direction acceleration $\alpha f$ and lateral direction acceleration $\alpha r$. The controller C also calculates a sway acceleration $\beta$, which is an acceleration in a horizontal lateral direction of the vehicle body center G, on the basis of the detected lateral direction acceleration $\alpha f$ and lateral direction acceleration $\alpha r$. The controller C then calculates thrust command values Ff, Fr, which are values of the thrust to be generated individually by the front and rear actuators Af, Ar, on the basis of the calculated yaw acceleration $\omega$ and sway acceleration $\beta$. The controller C then performs feedback control such that thrust corresponding to the thrust command values Ff, Fr is generated by the front and rear actuators Af, Ar, and in so doing suppresses vibration in the lateral direction of the vehicle body B.

In FIG. 1, two each of the actuator Af and the actuator Ar are provided, and the actuators Af, Ar are controlled by the single controller C. Instead, however, one controller C may be provided for each of the actuators Af, Ar.

Figure 2:
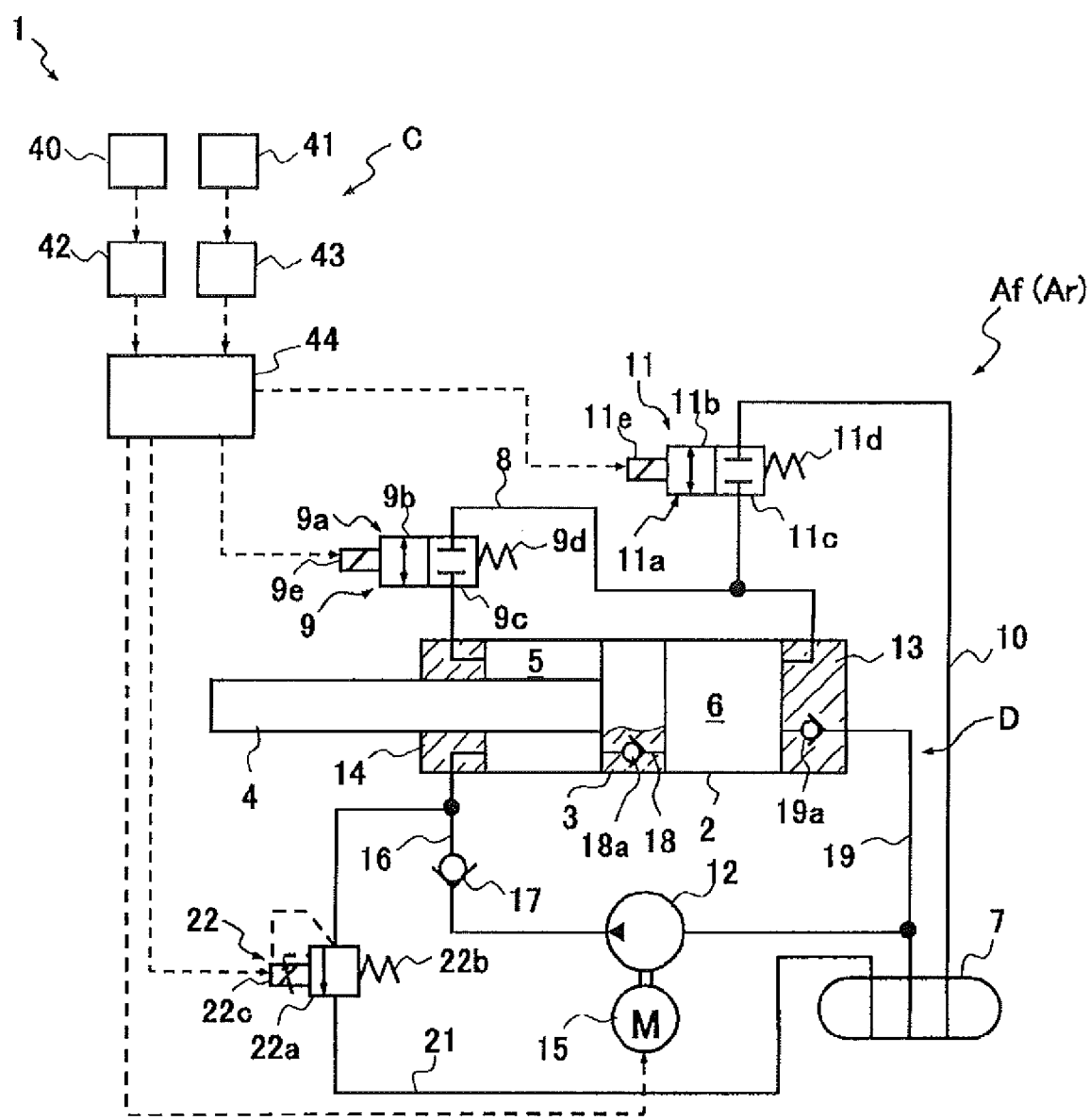
FIG. 2 is a detailed view of the railcar damping device according to this embodiment of this invention.

Next, referring to FIG. 2, a specific configuration of the railcar damping device 1 will be described.

Respective railcar damping devices 1 for expanding and contracting the front and rear actuators Af, Ar are configured similarly, and therefore, to avoid duplicate description, only the configuration of the railcar damping device 1 including the front side actuator Af will be described below, while specific description of the railcar damping device 1 including the rear side actuator Ar will be omitted.

The actuator Af includes a cylinder 2 coupled to one of the truck Tf and the vehicle body B of the railcar, a piston 3 inserted into the cylinder 2 to be free to slide, a rod 4 inserted into the cylinder 2 and coupled to the other of the truck Tf and the vehicle body B and to the piston 3, and a rod side chamber 5 and a piston side chamber 6 defined within the cylinder 2 by the piston 3. The actuator Af is constituted by a single rod type actuator. The railcar damping device 1 also includes a tank 7 storing working oil as a liquid that is supplied to and discharged from the cylinder 2, a first opening/closing valve 9 provided in a first passage 8 that connects the rod side chamber 5 to the piston side chamber 6 to be capable of opening and closing the first passage 8, a second opening/closing valve 11 provided in a second passage 10 that connects the piston side chamber 6 to the tank 7 to be capable of opening and closing the second passage 10, and a pump 12 that is driven to rotate at a predetermined normal rotation speed in order to supply the working oil to the rod side chamber 5 from the tank 7. The working oil is charged into rod side chamber 5 and the piston side chamber 6, and a gas is charged into the tank 7 in addition to the working oil. It should be noted that there is no particular need to set the tank 7 in a pressurized condition by compressing the gas charged therein.

The actuator Af performs an expansion operation by driving the pump 12 in a condition where the first passage 8 is set in a communicative condition by the first opening/closing valve 9 and the second opening/closing valve 11 is closed. Further, the actuator Af performs a contraction operation by driving the pump 12 in a condition where the second passage 10 is set in a communicative condition by the second opening/closing valve 11 and the first opening/closing valve 9 is closed.

The respective parts of the actuator Af will now be described in detail.

The cylinder 2 is formed in a tubular shape. One end (a right end in FIG. 2) of the cylinder 2 is closed by a lid 13, and an annular rod guide 14 is attached to another end (a left end in FIG. 2). The rod 4 inserted into the cylinder 2 to be free to slide is inserted into the rod guide 14 to be free to slide. The rod 4 projects to the exterior of the cylinder 2 at one end, and another end is coupled to the piston 3 inserted into the cylinder 2 to be free to slide.

An outer periphery of the rod 4 is sealed from the rod guide 14 by a seal member, not shown in the figures. As a result, the interior of the cylinder 2 is maintained in an airtight condition. As described above, the working oil is charged into the rod side chamber 5 and the piston side chamber 6 defined within the cylinder 2 by the piston 3. Another liquid suitable for an actuator may be used as the liquid charged into the cylinder 2 instead of the working oil.

In the actuator Af, the rod 4 is formed such that a sectional area thereof is half a sectional area of the piston 3. In other words, a pressure receiving surface area of the piston 3 on the rod side chamber 5 side is half a pressure receiving surface area of the piston 3 on the piston side chamber 6 side. Hence, when a pressure in the rod side chamber 5 is set to be identical during the expansion operation and the contraction operation, an identical thrust is generated during both expansion and contraction. Further, an amount of working oil supplied to and discharged from the rod side chamber 5 relative to a displacement amount of the actuator Af is identical on both the expansion and the contraction sides.

More specifically, when the actuator Af is caused to perform the expansion operation, the rod side chamber 5 and the piston side chamber 6 communicate via the first passage 8 such that the working oil pressure in the rod side chamber 5 and the working oil pressure in the piston side chamber 6 are equal. As a result, a thrust obtained by multiplying the pressure of the working oil by a pressure receiving surface area difference in the piston 3 between the rod side chamber 5 side and the piston side chamber 6 side is generated. When the actuator Af is caused to perform the contraction operation, on the other hand, communication between the rod side chamber 5 and the piston side chamber 6 is cut off such that the piston side chamber 6 communicates with the tank 7 via the second passage 10. As a result, a thrust obtained by multiplying the pressure of the working oil in the rod side chamber 5 by the pressure receiving surface area on the rod side chamber 5 side of the piston 3 is generated. Thus, during both expansion and contraction, the thrust generated by the actuator Af takes a value obtained by multiplying the pressure of the working oil in the rod side chamber 5 by half the sectional area of the piston 3. Therefore, the thrust of the actuator Af can be controlled by controlling the pressure of the rod side chamber 5 during both the expansion operation and the contraction operation.

In the actuator Af at this time, the pressure receiving surface area on the rod side chamber 5 side of the piston 3 is set at half the pressure receiving surface area on the piston side chamber 6 side. Therefore, when identical thrust is generated on both the expansion and contraction sides, the pressure in the rod side chamber 5 is identical on both the expansion side and the contraction side, making control simple. Further, the amount of working oil supplied to and discharged from the rod side chamber 5 relative to the displacement amount is also identical, and therefore an identical response is realized on both the expansion and contraction sides.

It should be noted that the thrust of the actuator Af on the expansion and contraction sides can be controlled by the pressure in the rod side chamber 5 even when the pressure receiving surface area on the rod side chamber 5 side of the piston 3 is not set at half the pressure receiving surface area on the piston side chamber 6 side.

A free end (a left end in FIG. 2) of the rod 4 and the lid 13 that closes one end of the cylinder 2 are provided with attachment portions, not shown in the figures. The actuator Af can be interposed between the vehicle body B and the truck Tf of the railcar by these attachment portions.

The rod side chamber 5 and the piston side chamber 6 are connected by the first passage 8. The first opening/closing valve 9 is provided midway in the first passage 8. The first passage 8 connects the rod side chamber 5 and the piston side chamber 6 on the exterior of the cylinder 2, but instead, a passage connecting the rod side chamber 5 and the piston side chamber 6 may be provided in the piston 3.

The first opening/closing valve 9 is a solenoid opening/closing valve including a valve 9a having a communication position 9b and a cutoff position 9c, a spring 9d that biases the valve 9a to be switched to the cutoff position 9c, and a solenoid 9e which, when energized, switches the valve 9a to the communication position 9b against the spring 9d. When switched to the communication position 9b, the first opening/closing valve 9 opens the first passage 8 such that the rod side chamber 5 communicates with the piston side chamber 6. When switched to the cutoff position 9c, the first opening/closing valve 9 cuts off communication between the rod side chamber 5 and the piston side chamber 6.

The piston side chamber 6 and the tank 7 are connected by the second passage 10. The second opening/closing valve 10 is provided midway in the second passage 10. The second opening/closing valve 11 is a solenoid opening/closing valve including a valve 11a having a communication position 11b and a cutoff position 11c, a spring 11d that biases the valve 11a to be switched to the cutoff position 11c, and a solenoid 11e which, when energized, switches the valve 11a to the communication position 11b against the spring 11d. When switched to the communication position 11b, the second opening/closing valve 11 opens the second passage 10 such that the piston side chamber 6 communicates with the tank 7. When switched to the cutoff position 11c, the second opening/closing valve 11 cuts off communication between the piston side chamber 6 and the tank 7.

The pump 12 is driven by a motor 15. The pump 12 discharges the working oil in only one direction. A discharge port of the pump 12 communicates with the rod side chamber 5 via a supply passage 16, while a suction port of the pump 12 communicates with the tank 7. When driven by the motor 15, the pump 12 suctions the working oil from the tank 7 and supplies the working oil to the rod side chamber 5.

Since the pump 12 discharges the working oil in only one direction, an operation to switch a rotation direction thereof is not required. Therefore, a problem in which a discharge amount varies when the rotation direction is switched does not arise. Hence, an inexpensive gear pump or the like can be applied to the pump 12. Further, the rotation direction of the pump 12 is always the same direction, and therefore the motor 15 serving as a drive source for driving the pump 12 does not require a high response in relation to a rotation switch. Hence, an inexpensive motor may likewise be applied to the motor 15. A check valve 17 that prevents backflow of the working oil from the rod side chamber 5 to the pump 12 is provided in the supply passage 16.

In the railcar damping device 1, the working oil is supplied from the pump 12 to the rod side chamber 5 at a predetermined discharge flow rate. When the actuator Af of the railcar damping device 1 is caused to perform the expansion operation, the pressure in the rod side chamber 5 is regulated by opening the first opening/closing valve 9 and opening and closing the second opening/closing valve 11. When the actuator Af of the railcar damping device 1 is caused to perform the contraction operation, on the other hand, the pressure in the rod side chamber 5 is regulated by opening the second opening/closing valve 11 and opening and closing the first opening/closing valve 9. In so doing, thrust corresponding to the thrust command valve Ff described above can be obtained.

During the expansion operation, the rod side chamber 5 and the piston side chamber 6 are set in a communicative condition such that the pressure in the piston side chamber 6 is identical to the pressure in the rod side chamber 5. Hence, in the railcar damping device 1, the thrust of the actuator Af can be controlled by controlling the pressure in the rod side chamber 5 during both the expansion operation and the contraction operation.

The first opening/closing valve 9 and the second opening/closing valve 11 may be variable relief valves having an adjustable valve opening pressure so as to be capable of opening and closing. In this case, the thrust of the actuator Af can be adjusted during the expansion and contraction operations by adjusting the respective valve opening pressures of the first opening/closing valve 9 and the second opening/closing valve 11 rather than performing opening/closing operations thereon.

As described above, the thrust of the actuator Af can be adjusted, and to make thrust adjustment easier, the railcar damping device 1 is provided with an exhaust passage 21 that connects the rod side chamber 5 to the tank 7, and a variable relief valve 22 that is provided midway in the exhaust passage 21 and has a modifiable valve opening pressure.

The variable relief valve 22 is a proportional solenoid relief valve including a valve body 22a provided in the exhaust passage 21, a spring 22b that biases the valve body 22a so as to cut off the exhaust passage 21, and a proportional solenoid 22c which, when energized, generates thrust against the spring 22b. The valve opening pressure of the variable relief valve 22 can be adjusted by adjusting a current amount flowing to the proportional solenoid 22c.

In the variable relief valve 22, the pressure of the working oil in the rod side chamber 5 upstream of the exhaust passage 21 acts on the valve body 22a as a pilot pressure. When the pressure of the working oil acting on the valve body 22a of the variable relief valve 22 exceeds a relief pressure (the valve opening pressure), a resultant force of thrust generated by the pressure of the working oil in the rod side chamber 5 and the thrust generated by the proportional solenoid 22c overcomes a biasing force of the spring 22b that biases the valve body 22a in a direction for cutting off the exhaust passage 21, thereby causing the valve body 22a to retreat, and as a result, the exhaust passage 21 is opened.

In the variable relief valve 22, when the current amount supplied to the proportional solenoid 22c is increased, the thrust generated by the proportional solenoid 22c increases. Hence, when the current amount supplied to the proportional solenoid 22c is set at a maximum, the valve opening pressure reaches a minimum, and conversely, when no current is supplied to the proportional solenoid 22c at all, the valve opening pressure reaches a maximum.

Hence, by providing the exhaust passage 21 and the variable relief valve 22, the pressure in the rod side chamber 5 is identical to the valve opening pressure of the variable relief valve 22 during the expansion and contraction operations of the actuator Af. Therefore, by adjusting the valve opening pressure of the variable relief valve 22, the pressure in the rod side chamber 5 can be adjusted easily.

By adjusting the valve opening pressure of the variable relief valve 22 in this manner, the thrust of the actuator Af is controlled. There is therefore no need to provide a sensor in order to adjust the thrust of the actuator Af, no need to open and close the first opening/closing valve 9 and the second opening/closing valve 11 at high speed, and no need to provide a variable relief valve having a function for opening and closing the first opening/closing valve 9 and the second opening/closing valve 11. As a result, the railcar damping device 1 can be constructed inexpensively, and a robust system in terms of both hardware and software can be constructed.

When a proportional solenoid relief valve in which the valve opening pressure can be varied proportionally in accordance with the applied current amount is used as the variable relief valve 22, the valve opening pressure can be controlled easily. However, the variable relief valve 22 is not limited to a proportional solenoid relief valve, and any relief valve having an adjustable valve opening pressure may be used.

When an excessive input is input into the actuator Af in an expansion/contraction direction such that the pressure in the rod side chamber 5 exceeds the valve opening pressure of the variable relief valve 22, regardless of the open/closed condition of the first opening/closing valve 9 and the second opening/closing valve 11, the variable relief valve 22 opens the exhaust passage 21 such that the rod side chamber 5 communicates with the tank 7. As a result, the pressure in the rod side chamber 5 escapes into the tank 7, and therefore the entire system of the railcar damping device 1 can be protected. Hence, by providing the exhaust passage 21 and the variable relief valve 22, the system can be protected.

The railcar damping device 1 includes a damper circuit D. The damper circuit D causes the actuator Af to function as a damper when the first opening/closing valve 9 and the second opening/closing valve 11 are both closed. The damper circuit D includes a rectifying passage 18 that is formed in the piston 3 to allow the working oil to flow only from the piston side chamber 6 toward the rod side chamber 5, and a suction passage 19 that allows the working oil to flow only from the tank 7 toward the piston side chamber 6. Further, the railcar damping device 1 includes the exhaust passage 21 and the variable relief valve 22, and therefore, when the actuator Af functions as a damper, the variable relief valve 22 functions as a damping valve.

More specifically, the rectifying passage 18 connects the piston side chamber 6 to the rod side chamber 5, and a check valve 18a is provided midway therein. The check valve 18 turns the rectifying passage 18 into a one-way passage that allows the working oil to flow only from the piston side chamber 6 toward the rod side chamber 5. The suction passage 19, meanwhile, connects the tank 7 to the piston side chamber 6, and a check valve 19a is provided midway therein. The check valve 19 turns the suction passage 19 into a one-way passage that allows the working oil to flow only from the tank 7 toward the piston side chamber 6.

It should be noted that by interposing a check valve that allows the working oil to flow only from the piston side chamber 6 toward the rod side chamber 5 in the cutoff position 9c of the first opening/closing valve 9, the first passage 8 may also be used as the rectifying passage 18. Further, by interposing a check valve that allows the working oil to flow only from the tank 7 toward the piston side chamber 6 in the cutoff position 11c of the second opening/closing valve 11, the second passage 10 may also be used as the suction passage 19.

By providing the damper circuit D configured as described above, when the first opening/closing valve 9 and the second opening/closing valve 11 of the railcar damping device 1 are switched to their respective cutoff positions 9c, 11c, the rod side chamber 5, the piston side chamber 6, and the tank 7 are connected in a row by the rectifying passage 18, the suction passage 19, and the exhaust passage 21. Since the rectifying passage 18, the suction passage 19, and the exhaust passage 21 allow the working oil to flow in only one direction, when the actuator Af is caused to expand and contract by an external force, working oil discharged from the cylinder 2 is returned to the tank 7 through the exhaust passage 21, while a working oil deficiency in the cylinder 2 is alleviated by supplying working oil into the cylinder 2 from the tank 7 through the suction passage 19.

At this time, the variable relief valve 22 serves as resistance to the flow of working oil, thereby functioning as a pressure control valve that regulates the pressure in the cylinder 2 to the valve opening pressure. Accordingly, the actuator Af functions as a passive uniflow damper.

During a failure in which the respective components of the railcar damping device 1 cannot be energized, the valves 9a, 11a of the first opening/closing valve 9 and the second opening/closing valve 11 are pressed by the springs 9d, 11d so as to be switched to their respective cutoff positions 9c, 11c. At this time, the variable relief valve 22 functions as a pressure control valve having a valve opening pressure that is fixed in a maximum condition. During a failure, therefore, the actuator Af automatically functions as a passive damper.

Instead of providing the variable relief valve 22 and the exhaust passage 21, the damper circuit D may be constituted separately by a passage that connects the rod side chamber 5 and the tank 7 and a damping valve provided midway in the passage.

To cause the actuators Af, Ar to generate a desired thrust in an expansion direction, the controller C rotates the motor 15 to supply working oil from the pump 12 into the cylinder 2, switches the respective first opening/closing valves 9 to the communication position 9b, and switches the second opening/closing valves 11 to the cutoff position 11c. As a result, the rod side chamber 5 and the piston side chamber 6 enter the communicative condition such that working oil is supplied thereto from the pump 12 and the piston 3 is pressed in the expansion direction (leftward in FIG. 2). The actuators Af, Ar thus generate thrust in the expansion direction. At this time, the actuators Af, Ar generate expansion direction thrust having a magnitude obtained by multiplying the pressure in the rod side chamber 5 and the piston side chamber 6 by the pressure receiving surface area difference in the piston 3 between the piston side chamber 6 side and the rod side chamber 5 side.

When the pressure in the rod side chamber 5 and the piston side chamber 6 exceeds the valve opening pressure of the variable relief valve 22, the variable relief valve 22 opens such that a part of the working oil supplied from the pump 12 escapes into the tank 7 through the exhaust passage 21. Thus, the pressure in the rod side chamber 5 and the piston side chamber 6 is controlled by the valve opening pressure of the variable relief valve 22, which is determined in accordance with the current amount applied to the variable relief valve 22.

To cause the actuators Af, Ar to generate a desired thrust in a contraction direction, on the other hand, the controller C rotates the motor 15 to supply working oil from the pump 12 into the rod side chamber 5, switches the first opening/closing valves 9 to the cutoff position 9c, and switches the second opening/closing valves 11 to the communication position 11b. As a result, the piston side chamber 6 and the tank 7 enter the communicative condition such that working oil is supplied to the rod side chamber 5 from the pump 12, and as a result, the piston 3 is pressed in the contraction direction (rightward in FIG. 2). The actuators Af, Ar thus generate thrust in the contraction direction. At this time, the actuators Af, Ar generate contraction direction thrust having a magnitude obtained by multiplying the pressure in the rod side chamber 5 by the pressure receiving surface area on the rod side chamber 5 side of the piston 3.

At this time, similarly to the operation to generate expansion direction thrust, the pressure in the rod side chamber 5 is controlled by the valve opening pressure of the variable relief valve 22, which is determined in accordance with the current amount applied to the variable relief valve 22.

Further, by switching the open/closed condition of the first opening/closing valve 9 and the second opening/closing valve 11 regardless of a driving condition of the motor 15, the actuators Af, Ar can be caused to function as dampers as well as actuators. Hence, troublesome and rapid valve switching operations are not required, and therefore a highly responsive and reliable system can be provided.

Since single rod type actuators are used as the actuators Af, Ar, a stroke length is easier to secure than with double rod type actuators. Therefore, an overall length of the actuators Af, Ar is shortened, and as a result, the actuators Af, Ar can be installed in the railcar more easily.

As regards the working oil supply from the pump 12 and the working oil flow during the expansion and contraction operations, the working oil passes through the rod side chamber 5 and the piston side chamber 6 of the actuators Af, Ar in that order, and is ultimately recirculated to the tank 7. Therefore, even when gas is intermixed into the rod side chamber 5 or the piston side chamber 6, the gas is automatically discharged into the tank 7 by the expansion and contraction operations of the actuators Af, Ar. As a result, a reduction in responsiveness during thrust generation due to intermixing of gas into the working oil can be prevented.

Hence, when the railcar damping device 1 is manufactured, troublesome operations such as assembling the railcar damping device 1 in oil or in a vacuum environment are not required. Further, an advanced degassing operation need not be performed on the working oil. As a result, a productivity of the railcar damping device 1 is improved, and manufacturing costs can be reduced.

Furthermore, even when gas is intermixed into the rod side chamber 5 and the piston side chamber 6, the gas is automatically discharged into the tank 7 by the expansion and contraction operations of the actuators Af, Ar. Therefore, frequent maintenance operations for the purpose of performance recovery are not required. As a result, labor and cost expended on maintenance can be reduced.

Next, referring mainly to FIGS. 3 and 4, the configuration of the controller C will be described.

As shown in FIG. 1, the controller C includes a front side acceleration sensor 40 that detects the lateral direction acceleration $\alpha f$ of the vehicle body front portion Bf serving as a front side of the vehicle body in the horizontal lateral direction relative to the vehicle advancement direction, and a rear side acceleration sensor 41 that detects the lateral direction acceleration $\alpha r$ of the vehicle body rear portion Br serving as a rear side of the vehicle body in the horizontal lateral direction relative to the vehicle advancement direction. Further, as shown in FIGS. 2 and 3, the controller C includes band pass filters 42, 43 that remove steady-state acceleration during travel on a curve, a drift component, and noise from the lateral direction accelerations $\alpha f$, $\alpha r$, and a control unit 44 that calculates command values from the lateral direction accelerations $\alpha f$, $\alpha r$ filtered by the band pass filters 42, 43 and outputs the calculated command values to the motor 15, the solenoid 9e of the first opening/closing valve 9, the solenoid 11e of the second opening/closing valve 11, and the proportional solenoid 22c of the variable relief valve 22. Thus, the controller C controls the thrust of the respective actuators Af, Ar.

It should be noted that since the band pass filters 42, 43 remove the steady-state acceleration during travel on a curve included in the lateral direction acceleration $\alpha f$ and the lateral direction acceleration $\alpha r$, the controller C can suppress only vibration that causes passenger comfort to deteriorate.

Figure 3:
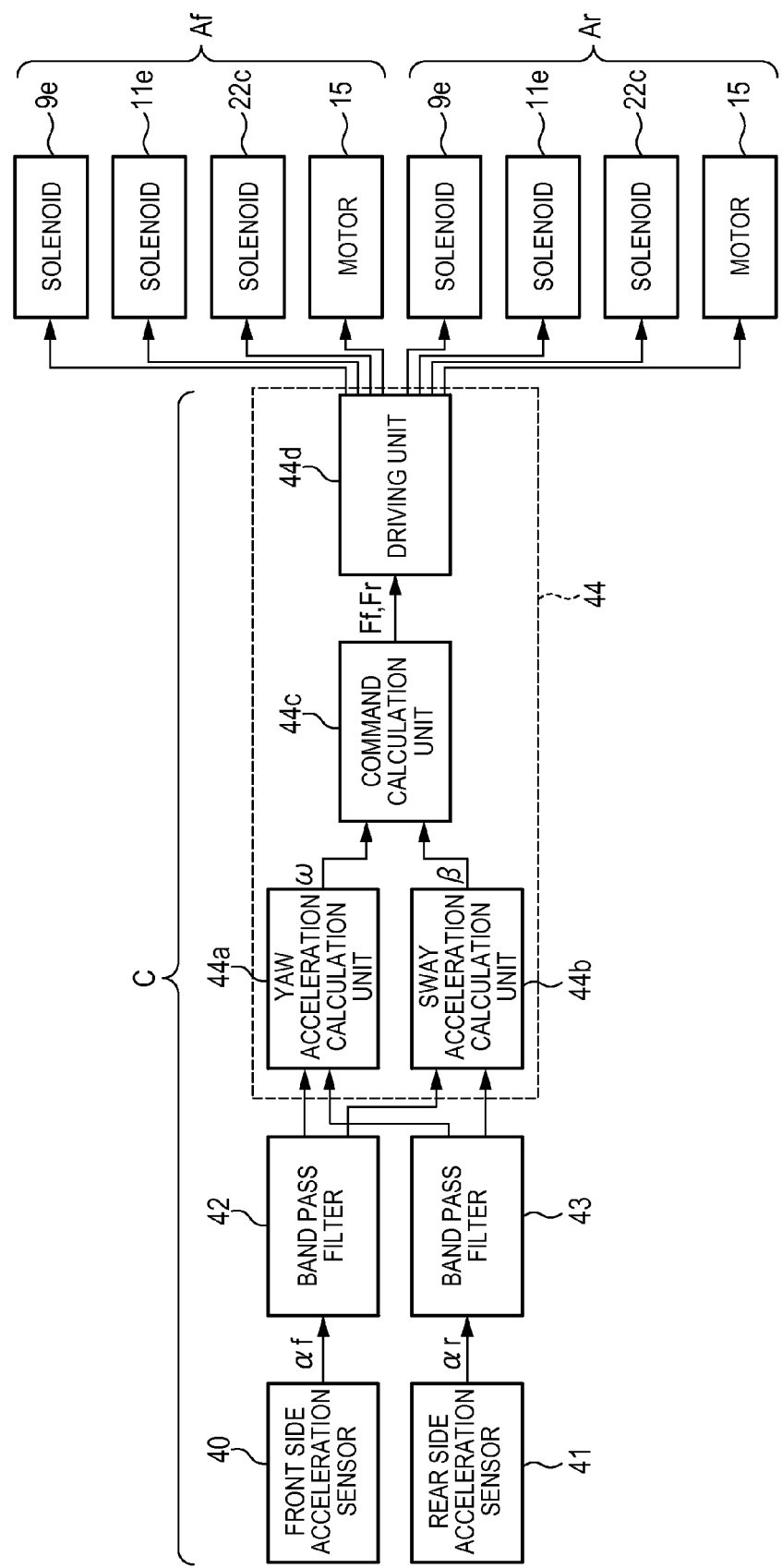
FIG. 3 is a control block diagram of a controller provided in the railcar damping device according to this embodiment of this invention.

As shown in FIG. 3, the control unit 44 includes a yaw acceleration calculation unit 44a that calculates the yaw acceleration $\omega$ about the vehicle body center G directly above the front and rear trucks Tf, Tr on the basis of the lateral direction acceleration $\alpha f$ and the lateral direction acceleration $\alpha r$, a sway acceleration calculation unit 44b that calculates the sway acceleration $\beta$ of the vehicle body center G of the vehicle body B on the basis of the lateral direction acceleration $\alpha f$ and the lateral direction acceleration $\alpha r$, a command calculation unit 44c that calculates the thrust command values Ff, Fr indicating the thrust to be generated individually by the front and rear actuators Af, Ar on the basis of the yaw acceleration $\omega$ and the sway acceleration $\beta$, and a driving unit 44d that drives the motor 15, the solenoid 9e of the first opening/closing valve 9, the solenoid 11e of the second opening/closing valve 11, and the proportional solenoid 22c of the variable relief valve 22 on the basis of the thrust command values Ff, Fr.

As hardware, the controller C includes, for example, an A/D converter for converting signals output by the front side acceleration sensor 40 and the rear side acceleration sensor 41 into digital signals and importing the digital signals, the aforesaid band pass filters 42, 43, a storage device such as a ROM (Read Only Memory) storing a program used for the processing required to control the railcar damping device 1, a calculation device such as a CPU (Central Processing Unit) that executes the processing on the basis of the program, and a storage device such as a RAM (Random Access Memory) that provides the CPU with a storage area. The respective units provided in the control unit 44 of the controller C may be realized by having the CPU execute the program for performing the processing described above. Alternatively, instead of providing the band pass filters 42, 43 as hardware, the band pass filters 42, 43 may be realized on software by having the CPU execute the program.

The lateral direction accelerations $\alpha f$, $\alpha r$ are set using an axis that passes through a center of the vehicle body B in an advancement direction (a left-right direction in FIG. 1) as a reference so as to be positive acceleration when oriented in a direction traveling toward the right side (upward in FIG. 1) and negative acceleration when oriented in a direction traveling toward the right side (downward in FIG. 1). The yaw acceleration calculation unit 44a calculates the yaw acceleration ω about the vehicle body center G directly above the front side truck Tf and the rear trucks Tr, respectively, by halving a difference between the front side lateral direction acceleration αf and the rear side lateral direction acceleration αr. The sway acceleration calculation unit 44b calculates the sway acceleration β of the vehicle body center G by halving a sum of the lateral direction acceleration αf and the lateral direction acceleration αr.

To calculate the yaw acceleration ω, the front side acceleration sensor 40 is preferably disposed in the vicinity of the front side actuator Af on a line extending in a front-rear direction or a diagonal direction including the vehicle body center G of the vehicle body B. Similarly, the rear side acceleration sensor 41 is preferably disposed in the vicinity of the rear side actuator Ar on a line extending in a front-rear direction or a diagonal direction including the vehicle body center G of the vehicle body B.

The yaw acceleration ω can also be calculated from respective distances between the vehicle body center G and the acceleration sensors 40, 41, positional relationships therebetween, and the lateral direction accelerations αf, αr. Therefore, installation positions of the acceleration sensors 40, 41 may be set as desired. In this case, instead of determining the yaw acceleration ω by halving the difference between the lateral direction acceleration αf and the lateral direction acceleration αr, the yaw acceleration ω is calculated from the difference between the lateral direction acceleration αf and the lateral direction acceleration αr, the respective distances between the vehicle body center G and the acceleration sensors 40, 41, and the positional relationships therebetween.

More specifically, when a front-rear direction distance between the front side acceleration sensor 40 and the vehicle body center G is set as Lf and a front-rear direction distance between the rear side acceleration sensor 41 and the vehicle body center G is set as Lr, the yaw acceleration ω is calculated from $\omega=(\alpha f-\alpha r)/(Lf+Lr)$. It should be noted that the yaw acceleration ω may be detected using a yaw acceleration sensor instead of being calculated from the accelerations detected by the front side acceleration sensor 40 and the rear side acceleration sensor 41.

Figure 4:
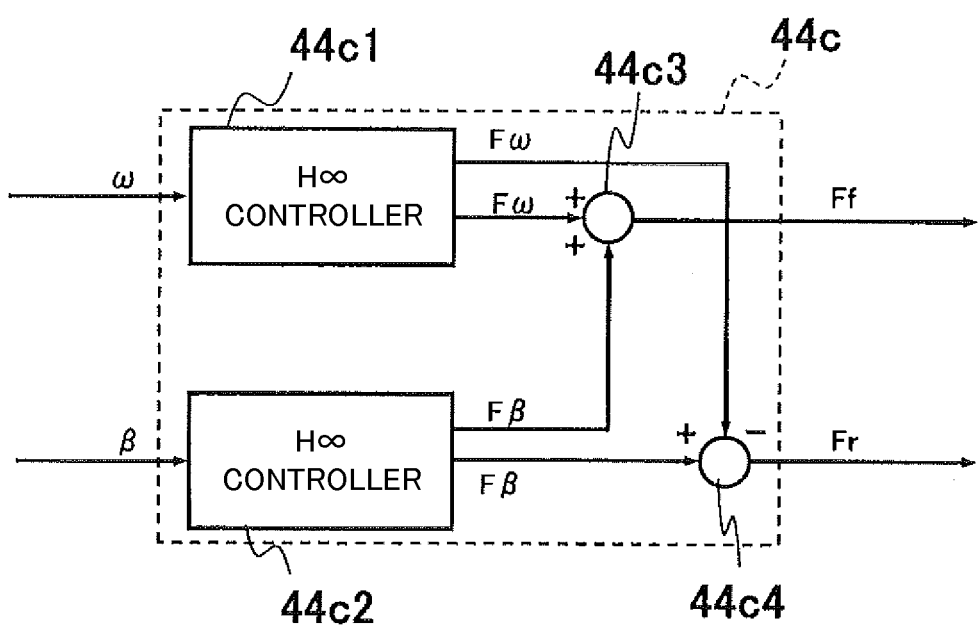
FIG. 4 is a control block diagram of a command calculation unit of the controller provided in the railcar damping device according to this embodiment of this invention.

As shown in FIG. 4, the command calculation unit 44c is configured to include H∞controllers 44c1, 44c2. The command calculation unit 44c includes the H∞controller 44c1 that calculates a thrust Fω (a yaw command value) for suppressing yaw vibration of the vehicle body B from the yaw acceleration ω calculated by the yaw acceleration calculation unit 44a, the H∞controller 44c2 that calculates a thrust Fβ (a sway command value) for suppressing sway vibration of the vehicle body B from the sway acceleration β calculated by the sway acceleration calculation unit 44b, an adder 44c3 that calculates the thrust command value Ff indicating the thrust to be output by the front side actuator Af by adding together the thrust Fω and the thrust Fβ, and a subtractor 44c4 that calculates the thrust command value Fr indicating the thrust to be output by the rear side actuator Ar by subtracting the thrust Fω from the thrust Fβ.

Since H∞control is executed by the command calculation unit 44c, a superior damping effect can be obtained irrespective of a frequency of the vibration input into the vehicle body B, and as a result, a high degree of robustness can be obtained. However, this does not preclude the use of control other than H∞control. Therefore, for example, the front and rear actuators Af, Ar may also be controlled using skyhook control, in which a lateral direction acceleration is obtained from the lateral direction accelerations αf, αr, and a thrust command value is determined by multiplying the lateral direction acceleration by a skyhook damping coefficient. Further, instead of the controlling the thrust values of the front and rear actuators Af, Ar in conjunction from the yaw acceleration ω and the sway acceleration β, the front side actuator Af and the rear side actuator Ar may be controlled independently of each other.

As shown in FIG. 3, the driving unit 44d outputs control commands to cause the actuators Af, Ar to generate thrust corresponding to the respective thrust command values Ff, Fr. More specifically, the driving unit 44d calculates control commands to be output to the motor 15, the solenoid 9e of the first opening/closing valve 9, the solenoid 11e of the second opening/closing valve 11, and the proportional solenoid 22c of the variable relief valve 22, and outputs the calculated control commands. Further, when calculating the control commands from the thrust command values Ff, Fr, the control commands may be calculated using feedback control by feeding back the thrust output by the actuators Af, Ar at that time.

More specifically, as described above, the driving unit 44d calculates the control commands to be output to the solenoid 9e of the first opening/closing valve 9, the solenoid 11e of the second opening/closing valve 11, and the proportional solenoid 22c of the variable relief valve 22 from the thrust command values Ff, Fr, and outputs the calculated control commands.

When the thrust command value Ff is equal to or larger than a preset normal lower limit value, the driving unit 44d drives the motor 15 to rotate the pump 12 at the normal rotation speed. When the thrust command value Ff is smaller than the preset normal lower limit value, on the other hand, the driving unit 44d reduces the rotation speed of the pump 12. In other words, the driving unit 44d drives the motor 15 to rotate the pump 12 at a low thrust rotation speed, which is set in advance at a lower rotation speed than the normal rotation speed. The driving unit 44d drives both the front and rear actuators Af, Ar, and therefore performs similar calculations in relation to the thrust command value Fr for the rear side actuator Ar in order to switch the rotation speed of the pump 12 between two stages, i.e. the normal rotation speed and the low thrust rotation speed.

The normal rotation speed is set to satisfy both a pressure required for the actuators Af, Ar to generate a required maximum thrust and a response speed required to generate thrust for the driving unit 44d to drive the first opening/closing valve, the second opening/closing valve, and the variable relief valve 22.

More specifically, the driving unit 44d compares the thrust command value Ff for the front side actuator Af and the thrust command value Fr for the rear side actuator Fr respectively with the aforesaid normal lower limit value. The driving unit 44d then determines whether to drive the pump 12 at the normal rotation speed or the low thrust rotation speed, and then drives the pump 12 to rotate.

The normal lower limit value is set at a minimum value of the thrust that can be output by the actuators Af, Ar in accordance with a pressure loss (a basic pressure loss) occurring when the pump 12 is driven to rotate at the normal rotation speed such that the value opening pressure of the variable relief valve 22 is minimized and the working oil is discharged from the pump 12 so as to pass through a hydraulic circuit described above and move into the tank 7. In other words, the normal lower limit value is a lower limit value of the thrust that can be generated by the actuators Af, Ar when the pump 12 is rotated at the normal rotation speed. In a case where the lower limit values of the thrust that can be generated respectively by the actuators Af, Ar are different, the normal lower limit value of the front side actuator Af and the normal lower limit value of the rear side actuator Ar may be set at different values.

As described above, when the thrust command values Ff, Fr are smaller than the normal lower limit value, the driving unit 44d controls the motor 15 to switch the rotation speed of the pump 12 to the low thrust rotation speed. However, when the thrust command value varies in an oscillatory manner about the normal lower limit value, the rotation speed of the pump 12 is increased and decreased frequently. Therefore, the driving unit 44d reduces the rotation speed of the pump 12 to the low thrust rotation speed when the thrust command values Ff, Fr remain below the normal lower limit value continuously for a predetermined time Td.

Further, when the thrust command values Ff, Fr increase to or above the normal lower limit value after the rotation speed of the pump 12 has been reduced, the motor 15 is controlled to return the rotation speed of the pump 12 to the normal rotation speed. Similarly in this case, however, when the thrust command value varies in an oscillatory manner about the normal lower limit value, the rotation speed of the pump 12 is increased and decreased frequently. Therefore, the driving unit 44d returns the rotation speed of the pump 12 to the normal rotation speed when the thrust command values Ff, Fr remain at or above the normal lower limit value continuously for a predetermined time Tu.

The determination as to whether or not the thrust command values Ff, Fr have remained below the normal lower limit value for at least the predetermined time Td may be made using a control period of the control unit 44. Assuming, for example, that the predetermined time Td is set at N seconds and the control unit 44 calculates the thrust command values Ff, Fr every m seconds (where N>m), the condition whereby the thrust command values Ff, Fr remain smaller than the normal lower limit value continuously for at least the predetermined time Td is satisfied when a number of consecutive times that the thrust command values Ff, Fr fall below the normal lower limit value reaches or exceeds (N÷m) consecutive times. As a result, the determination as to whether or not the condition is satisfied can be made by counting the number of consecutive times that the thrust command values Ff, Fr fall below the normal lower limit value.

Hence, the determination as to whether or not the thrust command values Ff, Fr have remained below the normal lower limit value for at least the predetermined time Td may be made using the control period. The determination as to whether or not the thrust command values Ff, Fr have remained at or above the normal lower limit value for at least the predetermined time Tu may be made similarly.

Alternatively, the above determination may be made by actually measuring the predetermined times Td, Tu. Specifically, the predetermined times Td, Tu are set within a range that does not inhibit the suppression of vibration in the vehicle body B of the railcar in accordance with a response time to a switch in the rotation speed of the motor 15. Thrust command values Ff, Fr lower than the normal lower limit value are output in a condition where the vibration of the vehicle body B is extremely small or the vehicle body B is not rocking. At this time, depending on the damping subject railcar, a vibration frequency of the vehicle body B is approximately 0.5 Hz. In this case, depending on a response time of the motor 15, the predetermined times Td, Tu may be set at approximately one second, for example, which corresponds to a half period.

The predetermined times Td, Tu may also be set at different values to each other. In a situation where the rotation speed of the pump 12 is returned to the normal rotation speed from the low thrust rotation speed, large vibration may be exerted on the vehicle body B, and therefore the actuators Af, Ar must be caused to generate a large thrust with a favorable response. Therefore, the predetermined time Td used when reducing the rotation speed may be set to be longer than the predetermined time Tu used when returning the rotation speed to the normal rotation speed.

Further, in this embodiment, rapid variation in the rotation speed of the pump 12 is avoided by varying the rotation speed over time both when the rotation speed is reduced from the normal rotation speed to the low thrust rotation speed and when the rotation speed is returned to the normal rotation speed from the low thrust rotation speed. In other words, the rotation speed of the pump 12 is varied gradually by ramp control.

With the railcar damping device 1 according to this embodiment, configured as described above, when the thrust command values Ff, Fr are equal to or larger than the normal lower limit value, the pump 12 is rotated at the normal rotation speed such that the actuators Af, Ar can be caused to generate sufficient thrust for suppressing vibration with favorable responsiveness. Conversely, when the thrust command values Ff, Fr are smaller than the normal lower limit value, the rotation speed of the pump 12 is reduced to the low thrust rotation speed, which is lower than the normal rotation speed. Accordingly, a discharge flow rate of the pump 12 is reduced such that the pressure loss of the actuators Af, Ar in the hydraulic circuit decreases, and as a result, a smaller thrust than the normal lower limit value can be generated.

Hence, with the railcar damping device 1 according to this embodiment, even when the thrust command values Ff, Fr are smaller than the normal lower limit value during feedback control of the thrust generated by the actuators Af, Ar, a deviation between the thrust command values Ff, Fr and the actually output thrust does not increase. Accordingly, hunting in which the thrust of the actuators Af, Ar becomes rectangular and oscillatory does not occur. As a result, the vehicle body B of the railcar is not caused to vibrate, and a vibration condition does not deteriorate. Furthermore, since hunting does not occur, the first opening/closing valve 9 and the second opening/closing valve 11 are not switched frequently, and therefore problems such as a reduction in the lifespan thereof and a corresponding reduction in economic efficiency also do not occur. Hence, the railcar damping device 1 according to this invention is economically efficient and does not cause passenger comfort in the vehicle body to deteriorate.

Further, the rotation speed of the pump 12 is reduced when the thrust command values Ff, Fr remain smaller than the normal lower limit value continuously for at least the predetermined time Td. With the railcar damping device 1, therefore, the rotation speed of the pump 12 can be reduced at a lower frequency, and as a result, both the rotation speed of the pump 12 and the thrust of the actuators Af, Ar can be stabilized.

Similarly, the rotation speed of the pump 12 is returned to the normal rotation speed from the low thrust rotation speed when the thrust command values Ff, Fr increase to or above the normal lower limit value and remain thus continuously for at least the predetermined time Tu. With the railcar damping device 1, therefore, the rotation speed of the pump 12 can be returned at a lower frequency, and as a result, both the rotation speed of the pump 12 and the thrust of the actuators Af, Ar can be stabilized.

Furthermore, in the railcar damping device 1, the rotation speed of the pump 12 is switched between two rotation speeds, namely the normal rotation speed and the low thrust rotation speed. Hence, by setting a digital contact output in the driving unit 44d, for example, the rotation speed of the pump 12 can be indicated in two stages when the rotation speed is to be reduced. In so doing, noise can be prevented more effectively than in a case where the rotation speed is reduced variably through control executed commensurately with the thrust command values Ff, Fr or the like, leading to an increase in the lifespan of seals and bearings of the pump 12 and the motor 15. As a result, a system that is robust and low in cost can be constructed.

By setting the rotation speed of the pump 12 in two stages, the effects described above are obtained. However, this invention is not limited thereto, and when the thrust command values Ff, Fr fall below the normal lower limit value, the rotation speed of the pump 12 may be reduced below the normal rotation speed by being varied variably in accordance with the values of the thrust command values Ff, Fr.

Further, when the rotation speed of the pump 12 is reduced or returned, the rotation speed is varied over time. In so doing, a situation in which the rotation speed of the pump 12 varies rapidly, leading to rapid variation in the thrust generated by the actuators Af, Ar, does not occur, and as a result, passenger comfort in the vehicle B is not impaired.

In the embodiment described above, the plurality of actuators Af, Ar are controlled by the single controller C, but this invention is not limited thereto, and the controller C may of course be provided for each actuator Af, Ar such that the actuators Af, Ar are controlled by the respective controllers C.

Although the invention has been described above with reference to certain embodiments, the invention is not limited to the embodiments described above. Modifications and variations of the embodiments described above will occur to those skilled in the art, within the scope of the claims.

The contents of Tokugan 2011-136161, with a filing date of Jun. 20, 2011 in Japan, are hereby incorporated by reference.

The embodiments of this invention in which an exclusive property or privilege is claimed are defined as follows:

1. A railcar damping device that suppresses vibration of a vehicle body of a railcar by determining a thrust to be output by an actuator as a thrust command value and controlling the actuator,
   wherein the actuator comprises:
   a cylinder coupled to one of a truck and the vehicle body;
   a piston inserted into the cylinder to be free to slide;
   a rod inserted into the cylinder and coupled to the piston and the other of the truck and the vehicle body; and
   a rod side chamber and a piston side chamber defined within the cylinder by the piston,
   wherein the railcar damping device comprises:
   a tank that is configured to store a liquid that is supplied to and discharged from the cylinder;
   a first opening/closing valve provided in a first passage connecting the rod side chamber to the piston side chamber to be capable of opening and closing the first passage;
   a second opening/closing valve provided in a second passage connecting the piston side chamber to the tank to be capable of opening and closing the second passage;
   a pump that is configured to be driven to rotate at a predetermined normal rotation speed in order to supply the liquid from the tank to the rod side chamber; and
   a control unit configured to:
   compare the thrust command value with a preset normal lower limit value, which is a lower limit value of a thrust that can be generated by the actuator when the pump is rotated at the normal rotation speed, and
   reduce a rotation speed of the pump when the thrust command value is smaller than the preset normal lower limit value.

2. The railcar damping device as defined in claim 1, wherein the control unit is further configured to reduce the rotation speed of the pump when the thrust command value remains smaller than the normal lower limit value continuously for a predetermined time.

3. The railcar damping device as defined in claim 1, wherein a low thrust rotation speed that is lower than the normal rotation speed is set in advance and the control unit is further configured to switch the rotation speed of the pump in two stages, i.e. between the normal rotation speed and the low thrust rotation speed.

4. The railcar damping device as defined in claim 1, wherein the control unit is further configured to return the rotation speed of the pump to the normal rotation speed when the thrust command value increases to or above the normal lower limit value after the rotation speed of the pump has been reduced.

5. The railcar damping device as defined in claim 1, wherein the control unit is further configured to return the rotation speed of the pump to the normal rotation speed when the thrust command value increases to or above the normal lower limit value after the rotation speed of the pump has been reduced and remains at or above the normal lower limit value continuously for a predetermined time.

6. The railcar damping device as defined in claim 4, wherein, the control unit is further configured to vary the rotation speed of the pump over time when the rotation speed of the pump is returned to the normal rotation speed or reduced.

7. The railcar damping device as defined in claim 1, further comprising:
   an exhaust passage connecting the rod side chamber to the tank; and
   a variable relief valve that is provided midway in the exhaust passage and has a modifiable valve opening pressure,
   wherein the control unit is further configured to control the thrust of the actuator by adjusting the valve opening pressure of the variable relief valve.

8. The railcar damping device as defined in claim 1, further comprising:
   a suction passage that is configured to allow the liquid to flow only from the tank toward the piston side chamber; and
   a rectifying passage that is configured to allow the liquid to flow only from the piston side chamber toward the rod side chamber.

* * * * *